Sept. 29, 1931.     E. BRASELMANN     1,824,768
CAR JACK
Filed Jan. 6, 1930

Inventor:

Patented Sept. 29, 1931

1,824,768

UNITED STATES PATENT OFFICE

EUGEN BRASELMANN, OF DELLE, NEAR BRECKERFELD, GERMANY

CAR JACK

Application filed January 6, 1930, Serial No. 418,830; and in Germany September 17, 1927.

This invention relates to a car jack, the spindle of which is raised and held by two clamping plates adapted to adopt an inclined position with regard to the spindle, one of said clamping plates adapted to be raised by means of a cam or lever, the other clamping plate being prevented from moving with the spindle and serving as locking device. The perfect operation of such a car jack depends mainly on the rapid and secure clamping of the spindle in the clamping plates. The clamping plates, in order to securely grip and hold the spindle when they are even slightly inclined, are set off or formed at the point where the spindle passes, so that the imaginary connection line between the two clamping points is perpendicular or approximately perpendicular to the spindle. The spindle can therefore be raised or lowered quite short distances.

An embodiment of the invention is illustrated by way of example in the accompanying drawings in which Fig. 1 shows the car jack in side elevation.

Figure 4:
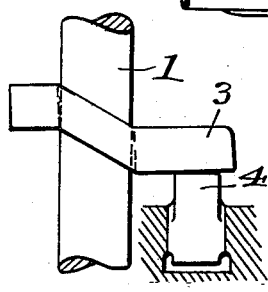
Fig. 4 shows in tilted position the feed plate serving to lift the spindle and under which the lifting cam acts.
Figure 5:
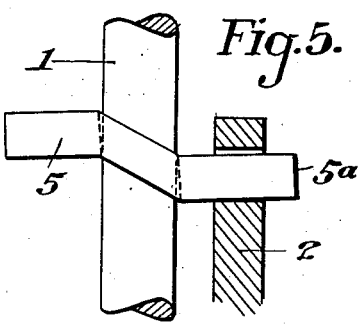
Fig. 5 shows in tilted position the locking plate which holds the raised spindle and is held at its end by the upright of the pack.

The spindle 1 of the car jack is guided in an upright 2, in which a feed plate 3 is shiftably mounted and adapted to be lifted by means of a lifting cam 4 operated by a hand lever. The feed plate 3 embraces the spindle 1 with little clearance. When lifted by the lifting cam 4, the feed plate 3 assumes an inclined position (as shown in Fig. 4) owing to the cam exerting an effect only on one side of the spindle, and the lifting plate, being edged, is jammed on the spindle so that, when being raised, it lifts the spindle. At the return movement of the lifting cam 4 the feed plate 3 assumes through the action of gravity the horizontal position so that it slides on the spindle 1 without any effect on the same. The spindle 1 is secured in the lifted position by a locking plate 5 embracing the spindle with little clearance. This locking plate is oscillatably mounted in the frame at the point 5a, so that it can adopt an inclined position on the spindle 1, as shown in Fig. 5. This locking plate, owing to its mounting in the frame, can however not move up and down with the spindle, and by a clamping action it secures the lifted spindle in its position. When the lifted spindle 1 has to be lowered, the free end of the locking plate 5 is raised, whereby the spindle 1 is liberated. The locking plate 5 is raised preferably with the aid of a short lever, as shown in dotted lines in Fig. 1, so that by gradually raising this locking plate the spindle can be braked at the descending movement. This lever is tapered towards its point to enable it to be easily inserted between the locking plate 5 and the top of the upright 2.

Figure 1:
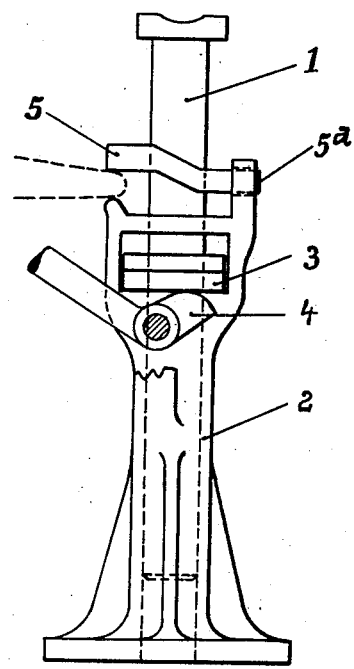
Figure 2:
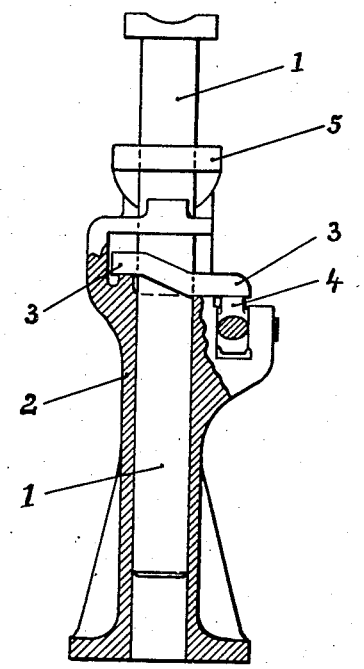
Fig. 2 is a front elevation partly in section.
Figure 3:
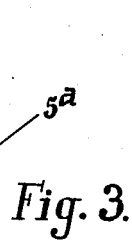
Fig. 3 is a top plan view.

To increase the clamping action of the feed plate 3 and of the locking plate 5 upon the spindle 1, they are both set off so that the imaginary line connecting the clamping points of the two plates is approximately perpendicular to the axis of the spindle (Figs. 1 and 2). For adapting the spindle to the height of the axle of the car to be lifted the spindle can be simply pulled upwards, as the two clamping plates only serve for lifting the spindle or to brake the descending movement of the same.

I claim:—

1. A car jack, comprising in combination with an upright frame and a spindle mounted in said frame, a lifting plate loosely mounted on said frame and embracing said spindle with little clearance, a lifting cam pivotally mounted on said frame under said lifting plate, a handle for operating said cam, and a locking plate hingedly mounted at one side on said frame and embracing said spindle with little clearance, said two plates being formed at a suitable point so that the imaginary line between their clamping points is approximately perpendicular to the axis of said spindle.

2. A car jack, comprising in combination with an upright frame and a ram mounted in said frame, a lifting plate loosely mounted on said frame and embracing said ram with little clearance, a lifting cam pivotally mounted on said frame under said lifting plate, a hand lever for operating said cam, and a locking plate hingedly mounted at one side on said frame and embracing said ram with little clearance, said two plates being formed at a suitable point so that the imaginary line between their clamping points is approximately perpendicular to the axis of said ram.

In testimony whereof I affix my signature.

EUGEN BRASELMANN.